US012789899B2

(12) United States Patent
Ishikawa et al.

(10) Patent No.: US 12,789,899 B2
(45) Date of Patent: Nov. 10, 2026

(54) CRASH ENERGY ABSORPTION PART FOR AUTOMOBILE, AND METHOD OF MANUFACTURING CRASH ENERGY ABSORPTION PART FOR AUTOMOBILE

(71) Applicant: JFE STEEL CORPORATION, Tokyo (JP)

(72) Inventors: Toshiharu Ishikawa, Tokyo (JP); Kazuhiko Higai, Tokyo (JP); Tsuyoshi Shiozaki, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 460 days.

(21) Appl. No.: 18/276,146

(22) PCT Filed: Oct. 29, 2021

(86) PCT No.: PCT/JP2021/040065
§ 371 (c)(1),
(2) Date: Aug. 7, 2023

(87) PCT Pub. No.: WO2022/172526
PCT Pub. Date: Aug. 18, 2022

(65) Prior Publication Data

US 2024/0092425 A1 Mar. 21, 2024

(30) Foreign Application Priority Data

Feb. 9, 2021 (JP) ................................ 2021-018749

(51) Int. Cl.
*B62D 21/15* (2006.01)
*B60R 19/34* (2006.01)
*B62D 29/00* (2006.01)

(52) U.S. Cl.
CPC ........... *B62D 21/152* (2013.01); *B60R 19/34* (2013.01); *B62D 29/001* (2013.01)

(58) Field of Classification Search
CPC ......... B60R 19/34; B60R 19/18; B62D 25/08; B62D 29/001; B62D 21/15; B62D 21/152
See application file for complete search history.

(56) References Cited

U.S. PATENT DOCUMENTS 10,035,525 B2 7/2018 Lenzi et al.
11,279,408 B2 3/2022 Hirose et al.
(Continued)

FOREIGN PATENT DOCUMENTS

CN 111051187 A 4/2020
EP 1133428 B1 8/2003
(Continued)

OTHER PUBLICATIONS

Higai et al., Japanese Patent No. JP2020-100183A , English translation dated 2025. (Year: 2020).*
(Continued)

*Primary Examiner* — Caroline N Butcher
(74) *Attorney, Agent, or Firm* — Oliff PLC

(57) ABSTRACT

A crash energy absorption part for an automobile is provided in a front portion or a rear portion of an automotive body and absorbing crash energy when a crash load is input from a front or a rear of the automotive body, and includes: a top portion; a tubular member including a side wall portion continuous with the top portion via a shoulder part of a punch; and a resin applied or patched to at least an inner surface of the shoulder part of a punch of the tubular member. The resin has a thickness gradually changing in an axial direction from one end side toward other end side, a thickest portion of the thickness is 8 mm or less, and the resin is bonded to the inner surface with an adhesive strength of 10 MPa or more and is axially crushed when the crash load is input.

13 Claims, 10 Drawing Sheets

(56) References Cited

U.S. PATENT DOCUMENTS

| | | | |
|---|---|---|---|
| 2005/0147804 A1 | 7/2005 | Harada et al. | |
| 2016/0347333 A1 | 12/2016 | Lenzi et al. | |
| 2020/0198703 A1 | 6/2020 | Hirose et al. | |
| 2022/0081033 A1 | 3/2022 | Tigai et al. | |
| 2022/0219631 A1 | 7/2022 | Higai et al. | |

FOREIGN PATENT DOCUMENTS

| | | | | | |
|---|---|---|---|---|---|
| JP | 07137587 | A | * | 5/1995 | |
| JP | H07-137587 | A | | 5/1995 | |
| JP | 2005-193755 | A | | 7/2005 | |
| JP | 2016-150725 | A | | 8/2016 | |
| JP | 2017-512152 | A | | 5/2017 | |
| JP | 2018-144529 | A | | 9/2018 | |
| JP | 2019-158028 | A | | 9/2019 | |
| JP | 2020100183 | A | * | 7/2020 | ........... B62D 29/005 |
| JP | 2020-138722 | A | | 9/2020 | |
| JP | 2020-192870 | A | | 12/2020 | |
| WO | 2015/128850 | A1 | | 9/2015 | |
| WO | 2020/129327 | A1 | | 6/2020 | |

OTHER PUBLICATIONS

Shimoda et al., Japanese Patent No. 07137587, English translation dated Sep. 29, 2025. (Year: 1995).*

Jul. 16, 2025 Office Action issued in European Patent Application No. 21925771.4.

Dec. 28, 2021 Search Report issued in International Patent Application No. PCT/JP2021/040065.

Aug. 23, 2023 International Preliminary Report on Patentability issued in International Patent Application No. PCT/ JP2021/040065.

Mar. 10, 2025 Office Action issued in Korean Patent Application No. 10-2023-7026784.

Aug. 13, 2025 Office Action issued in Chinese Patent Application No. 202180092892.0.

Jun. 6, 2024 Extended European Search Report issued in European Patent Application No. 21925771.4.

* cited by examiner

CRASH ENERGY ABSORPTION PART FOR AUTOMOBILE, AND METHOD OF MANUFACTURING CRASH ENERGY ABSORPTION PART FOR AUTOMOBILE

FIELD

The present invention relates to a crash energy absorption part for an automobile, and a method of manufacturing the crash energy absorption part for an automobile, and particularly relates to a crash energy absorption part for an automobile that absorbs a crash energy by axial crush when a crash load is input from the front or the rear of an automotive body, and a method of manufacturing the crash energy absorption part for an automobile.

BACKGROUND

As a technique for improving the crash energy absorptive properties of automobiles, there are many techniques such as optimization of shapes, structures, materials, and the like of automotive parts. For example, an automotive part such as a front side member or a crash box has a tubular member having a closed cross section structure, and when a crash load is input from the front or rear of an automotive body, the tubular member absorbs a crash energy by repeating buckling deformation in a bellows-shaped manner to cause axial crush.

However, since the bellows-shaped bending portion associated with the buckling deformation of the tubular member has a small bending radius unique to a metal sheet, stress is concentrated on an outer surface side of the bending portion and fractures are likely to occur, and if fractures occur in the bending portion in the process of axial crushing, the absorption effect of a crash energy is significantly reduced. Furthermore, in recent years, high-strength steel sheets have been adopted for automotive parts for the purpose of achieving both crash worthiness and weight reduction of automotive body. A high-strength steel sheet has ductility smaller than that of a conventional steel sheet, and therefore fractures are particularly likely to occur.

Patent Literature 1 discloses a crash energy absorption part for an automobile that prevents the occurrence of the above-described fractures and improves the absorptive properties of crash energy. According to Patent Document 1, by bonding a resin having a thickness of 8 mm or less to an inner surface of a tubular member with adhesive strength of 10 MPa or more, when the tubular member is buckled and deformed into a bellows shape at the time of crash, the bending radius is increased by interposing the resin between a metal sheet and a metal sheet at a bending portion of the bellows shape, and the bending radius is set to less than or be equal to a critical curvature radius for fracture, such that fracture of the bending portion can be prevented.

CITATION LIST

Patent Literature

Patent Literature 1: JP 2020-100183 A

SUMMARY

Technical Problem

Since the crash energy absorption part for an automobile as described above absorbs crash energy by axial crush of the tubular member, it is necessary to cause appropriate buckling deformation in an axial direction in order to obtain a stable crash energy absorption effect.

In this regard, since the crash energy absorption part for an automobile of Patent Literature 1 has a constant strength over the axial direction, it is not possible to specify a position where buckling deformation starts first at the time of crash. For example, when buckling deformation is started around the middle in the axial direction and the crash energy absorption part for an automobile is broken and bent, a crush residue is generated and axial crush is not sufficiently performed, and a predetermined crash energy absorption effect may not be obtained. Therefore, there has been a demand for a crash energy absorption part for an automobile capable of reliably causing buckling deformation from an end portion of the crash energy absorption part for an automobile and obtaining a stable crash energy absorption effect.

The present invention has been made to solve such problems, and an object of the present invention is to provide a crash energy absorption part for an automobile, which can be reliably buckled and deformed from one end side toward the other end side and can obtain a stable crash energy absorption effect when a crash load is input from the front or the rear of an automotive body and axial crush is performed, and a method of manufacturing the crash energy absorption part for an automobile.

Solution to Problem

A crash energy absorption part for an automobile according to the present invention is provided in a front portion or a rear portion of an automotive body and absorbing crash energy when a crash load is input from a front or a rear of the automotive body, and includes: a top portion; a tubular member including a side wall portion continuous with the top portion via a shoulder part of a punch; and a resin applied or patched to at least an inner surface of the shoulder part of a punch of the tubular member, wherein the resin has a thickness gradually changing in an axial direction from one end side toward other end side, a thickest portion of the thickness is 8 mm or less, and the resin is bonded to the inner surface with an adhesive strength of 10 MPa or more and is axially crushed when the crash load is input.

Moreover, the above-described crash energy absorption part for an automobile according to the present invention may further includes a separation prevention member configured to cover a surface of the resin, the separation prevention member being joined to an inner surface of the tubular member in order to prevent the resin from being separated from the inner surface, and the resin may be also bonded to the separation prevention member with an adhesive strength of 10 MPa or more.

Moreover, in the above-described crash energy absorption part for an automobile according to the present invention, a thickness of the resin gradually decreases from a side to which the crash load may be input.

Moreover, in the above-described crash energy absorption part for an automobile according to the present invention, a thickness of the resin gradually increases from a side to which the crash load may be input.

Moreover, a method of manufacturing the crash energy absorption part for an automobile according to the present invention includes the steps of: applying or patching the resin to at least the inner surface of the shoulder part of a punch of the tubular member such that the thickness gradually changes from one end side to the other end side in the axial direction and the thickest portion of the thickness is 8 mm or less; and performing heat treatment to the tubular member to which the resin is applied or patched under a predetermined condition to bond the resin to the inner surface of the tubular member with the adhesive strength of 10 MPa or more.

Moreover, a method of manufacturing the crash energy absorption part for an automobile includes the steps of: applying or patching the resin to at least the inner surface of the shoulder part of a punch of the tubular member such that the thickness gradually changes from one end side toward the other end side in the axial direction and the thickest portion of the thickness is 8 mm or less; joining a separation prevention member to the inner surface of the tubular member by disposing the separation prevention member so as to cover a surface of the resin, the separation prevention member being configured to prevent the resin applied or patched to the inner surface from being separated from the inner surface; and performing heat treatment to the tubular member to which the resin is applied or patched under a predetermined condition to bond the resin to each of the inner surface of the tubular member and the separation prevention member at the adhesive strength of 10 MPa or more.

Moreover, a method of manufacturing the crash energy absorption part for an automobile includes the steps of: applying or patching the resin to a portion of the separation prevention member, the portion facing at least the inner surface of the shoulder part of a punch when the separation prevention member is joined to the tubular member, such that the thickness gradually changes in the axial direction from one end side toward the other end side and the thickest portion of the thickness is 8 mm or less; disposing the separation prevention member such that the resin applied or patched to the separation prevention member abuts on the inner surface of the tubular member to join the separation prevention member to the inner surface of the tubular member; and performing heat treatment to the tubular member having the separation prevention member joined to the inner surface under a predetermined condition to bond the resin to each of the inner surface of the tubular member and the separation prevention member at the adhesive strength of 10 MPa or more.

Moreover, a method of manufacturing the crash energy absorption part for an automobile includes the steps of: joining the separation prevention member to the inner surface of the tubular member so as to form a gap between at least the inner surface of the shoulder part of a punch of the tubular member and the separation prevention member, the gap gradually changing in the axial direction from one end side toward other end side, and having a largest portion of 8 mm or less; applying or patching the resin to the gap; and performing heat treatment to the tubular member with the resin applied or patched to the gap under a predetermined condition to bond the resin to each of the inner surface of the tubular member and the separation prevention member at the adhesive strength of 10 MPa or more.

Moreover, in the method of manufacturing the crash energy absorption part for an automobile, a thickness of the resin gradually decreases from a side to which the crash load may be input.

Moreover, in the method of manufacturing the crash energy absorption part for an automobile, a thickness of the resin gradually increases from a side to which the crash load may be input.

Moreover, in the method of manufacturing the crash energy absorption part for an automobile, a size of the gap gradually decreases from a side to which the crash load may be input.

Moreover, in the method of manufacturing the crash energy absorption part for an automobile, a size of the gap gradually increases from a side to which the crash load may be input.

Advantageous Effects of Invention

In the present invention, since the resin applied or patched to at least the inner surface of the shoulder part of a punch of the tubular member is provided, and the thickness of the resin gradually changes in the axial direction from one end side toward the other end side, buckling deformation can be reliably caused from an end portion side where the thickness of the resin is thinner, and a stable crash energy absorption effect can be obtained.

DESCRIPTION OF EMBODIMENTS

A crash energy absorption part for an automobile and a method of manufacturing the crash energy absorption part for an automobile according to first and second embodiments of the present invention will be described below with reference to FIGS. 1 to 6. Note that, in the present specification and the drawings, elements having substantially the same function and configuration are denoted by the same reference signs, and redundant description is omitted.

First Embodiment

<Crash Energy Absorption Part for Automobile>

Figure 1:
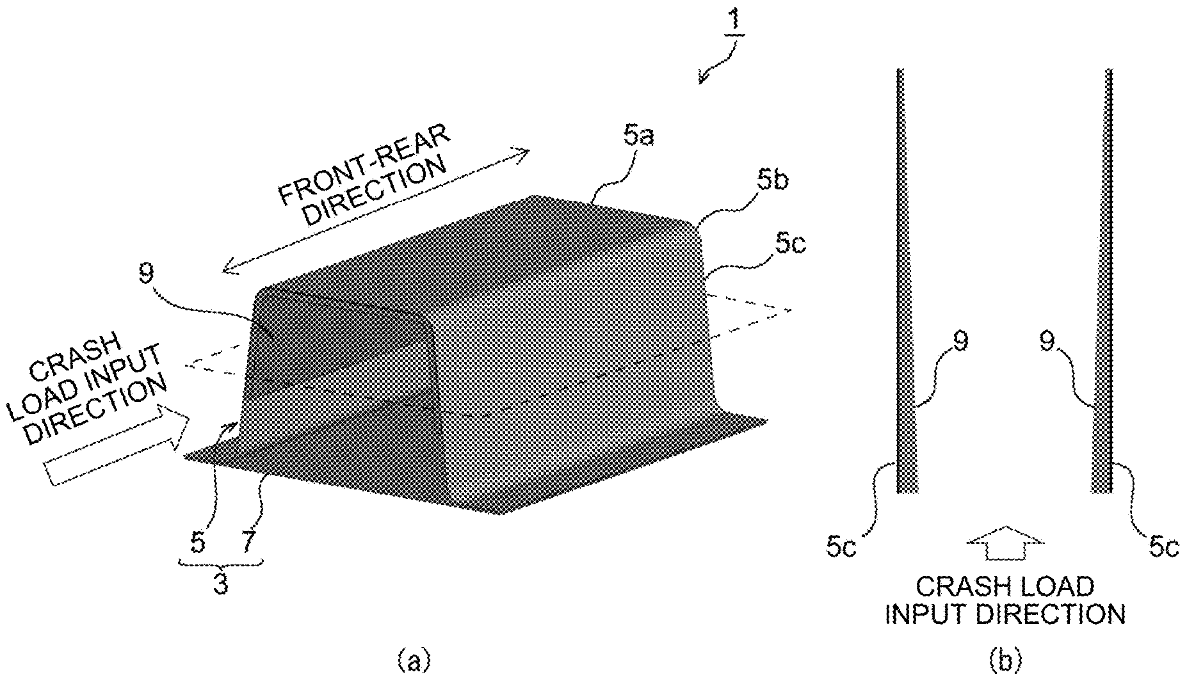
FIG. 1 is a diagram illustrating a crash energy absorption part for an automobile according to a first embodiment of the present invention, in which FIG. 1(*a*) is a perspective view, and FIG. 1(*b*) is an end view in a cross section indicated by a broken line in FIG. 1(*a*).
Figure 2:
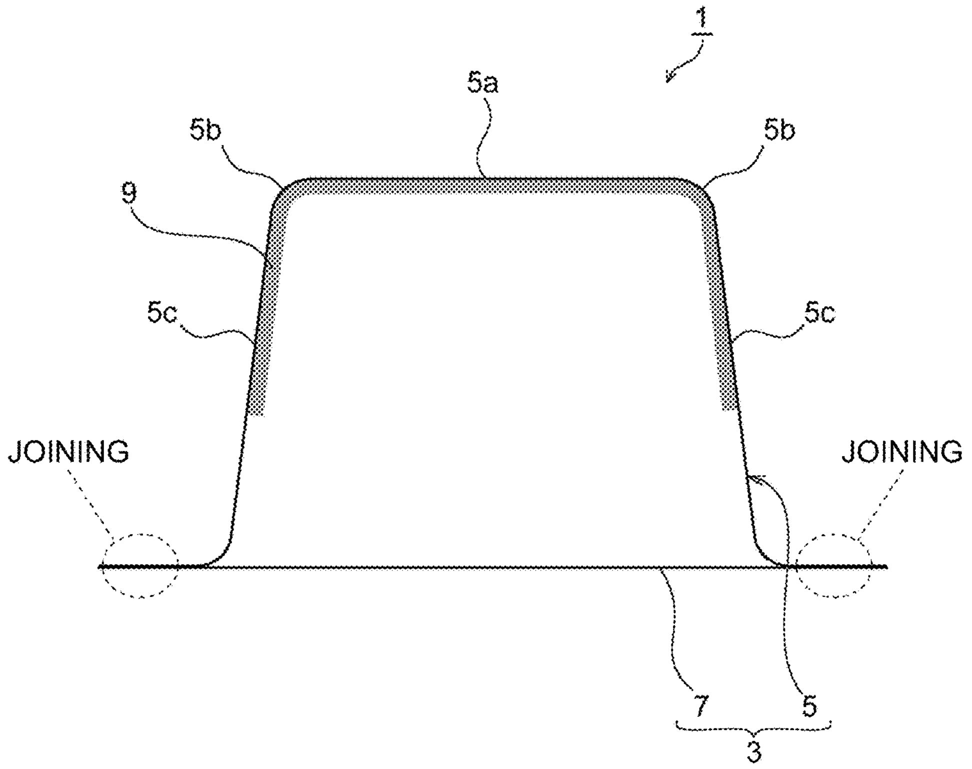
FIG. 2 is a cross-sectional view illustrating the crash energy absorption part for an automobile according to the first embodiment of the present invention.

As illustrated in FIGS. 1 and 2, a crash energy absorption part 1 for an automobile according to a first embodiment of the present invention is provided in a front portion or a rear portion of an automotive body, and absorbs crash energy by axially crushing in a longitudinal direction of a tubular member 3 when a crash load is input from a front or a rear of the automotive body, and includes the tubular member 3 formed in a tube-like shape by joining outer parts 5 and inner parts 7, and a resin 9 applied to an inner surface of the tubular member 3. Note that the examples illustrated in FIGS. 1 and 2 assume that a crash load is input from a direction indicated by an outlined arrow in the drawings.

As illustrated in FIG. 1(*a*), for example, the tubular member 3 is formed in a tube-like shape by joining the outer parts 5 having a hat-shaped cross section made of a metal sheet and the inner parts 7 having a flat plate shape made of a metal sheet, has a closed cross-sectional space therein, and absorbs crash energy by axial crush. The outer parts 5 includes a top portion 5*a*, a side wall portion 5*c* continuous with the top portion 5*a* via a shoulder part of a punch 5*b*. Here, the closed cross-sectional space is a space in which a cross-sectional shape of a peripheral wall portion of the tubular member 3 in a direction intersecting an axial direction of the tubular member 3 is a closed cross section, and in the tubular member 3 illustrated in FIG. 1(*a*), the closed cross-sectional space is formed by a closed cross section continuous along the axial direction. Such a closed cross-sectional space is formed by joining the outer parts 5 having a hat-shaped cross section and the inner parts 7 having a flat plate shape, and spot welding, for example, can be applied to join the outer parts 5 and the inner parts 7.

The tubular member 3 having such a closed cross-sectional space is used for an automotive part having a closed cross-sectional structure, such as a front side member extending in a front-rear direction of the automotive body at the left and right positions of the front portion of the automotive body and constituting a part of the automotive body frame, and a crash box provided at a front end or a rear end of the automotive body frame. The automotive part is disposed in the automotive body such that the axial direction (longitudinal direction) of the tubular member 3 coincides with the front-rear direction of the automotive body.

Furthermore, examples of the type of metal sheet used for the tubular member 3 used as an automotive part include a cold rolled steel sheet, a hot rolled steel sheet, a stainless steel sheet, a zinc-based coating steel sheet, a zinc alloy coating steel sheet, an aluminum alloy coating steel sheet, and an aluminum alloy sheet.

As illustrated in FIGS. 1 and 2, the resin 9 is applied to at least an inner surface of the shoulder part of a punch 5*b* of the outer parts 5 constituting the tubular member 3, forms a part of the closed cross-sectional space of the tubular member 3, and is bonded to the outer parts 5 with an adhesive strength of 10 MPa or more.

Furthermore, the resin 9 has a thickness that gradually changes in the axial direction from one end side toward the other end side, and in the present embodiment, as illustrated in FIG. 1(*b*), the thickness of the resin gradually decreases from a side to which a crash load is input. The thickness of the resin 9 is 8 mm or less at the thickest portion (in the case of FIG. 1, the end portion on the side to which the crash load is input).

Note that the thickness of the resin 9 may gradually increase from the side to which the crash load is input, and even in this case, the thickness of the resin 9 is 8 mm or less at the thickest portion (end portion on a side opposite to the side to which the crash load is input).

Examples of the type of the resin 9 in the crash energy absorption part 1 for an automobile according to the first embodiment include a thermoplastic resin, a thermoset resin, and an elastomer resin. Examples of the thermoplastic resin include vinyl resins (vinyl acetate, vinyl chloride, and the like), acrylic resins, polyamide resins, polystyrene resins, and cyanoacrylate resins. Examples of the thermoset resin include epoxy resins, urethane resins, ester resins, phenolic resins, melamine resins, and urea resins. Examples of the elastomer resin include nitrile rubber resins, styrene butadiene rubber resins, modified silicone resins, butyl rubber resins, urethane rubber resins, and acrylic rubber resins.

From the viewpoint of weight reduction of the crash energy absorption part 1 for an automobile, a foamed resin is preferable as the resin 9. Note that when a foamed resin is used as the resin 9, a foaming ratio is not particularly limited.

Note that the adhesive strength between the resin 9 and the tubular member 3 can be a maximum shear stress or an average shear stress acting on an interface between the metal sheet and the resin, and the maximum shear stress or the average shear stress can be obtained by, for example, a crash analysis of a double-layered square column in which a metal sheet (steel sheets or the like) and a resin adhere to each other.

Furthermore, the adhesive strength between the resin 9 and the tubular member 3 may be obtained in a manner that a part of the resin 9 and the tubular member 3 after adhesion is cut out, the cut resin 9 and tubular member 3 are placed in a tensile testing machine, and the resin 9 on one side and the tubular member 3 on the other side are pulled. Alternatively, the adhesive strength between the resin 9 and the tubular member 3 may be measured in a manner that a part of the tubular member 3 and the resin 9 after adhesion is cut out and placed in a tensile testing machine, and one part grasps the resin 9 while the other part grasps and pulls: a grip portion (not illustrated) formed by bending the tubular member 3 made of metal sheet; or a gripping part joined to the tubular member 3.

As described above, in the crash energy absorption part 1 for an automobile according to the first embodiment, the resin 9 is applied to the inner surface of the tubular member 3, but in the present invention, a plate-shaped resin having a thickest portion of 8 mm or less and a thickness gradually changing in the axial direction from one end side to the other end side may be patched to the inner surface of the tubular member 3 using an adhesive. Also in the above case, the adhesive strength between the plate-shaped resin and the inner surface of the tubular member 3 is required to be 10 MPa or more.

In the crash energy absorption part 1 for an automobile according to the first embodiment, since the thickness of the resin 9 gradually changes in the axial direction from one end side to the other end side of the tubular member 3, for example, when a crash load is input from the direction indicated by a hollow arrow in FIG. 1, buckling deformation is started from an end portion on the side where the thickness of the resin 9 is thin (the side opposite to the side where the crash load is input). Thereafter, buckling deformation is sequentially generated toward an end portion on the side where the thickness of the resin 9 is thick in the axial direction, and a stable crash energy absorption effect can be obtained. This point will be demonstrated in Examples described later. However, in a case where the thickness of the resin 9 gradually increases from the side where the crash load is input, the buckling deformation is started from the end portion on the side where the crash load is input, and then the buckling deformation is performed toward the end portion on the side where the thickness of the resin 9 is thick in the axial direction. Also in this case, a crash energy absorption effect similar to that of the crash energy absorption part 1 for an automobile illustrated in FIG. 1 is exhibited. This point will be demonstrated in Examples described later.

Furthermore, since the resin 9 is applied or patched to the inner surface of the tubular member 3 and bonded with an adhesive strength of 10 MPa or more, the resin 9 is compressed and deformed together with the tubular member 3 without being peeled off and separated from the inner surface of the tubular member 3 in the process of axial crush. As a result, buckling strength of the tubular member 3 can be improved, and buckling deformation can be repeatedly generated in a bellows shape in the tubular member 3 without reducing flow stress of the tubular member 3. As a result, absorptive properties of crash energy can be improved.

Moreover, by setting the thickness of the thickest portion of the resin 9 to 8 mm or less, when the tubular member 3 undergoes buckling deformation, the resin 9 is sandwiched between the metal sheet and the metal sheet in the convexly deformed bent portion, such that it is possible to prevent a bending radius of the convexly bent portion from becoming smaller than a critical curvature radius for fracture unique to the metal sheet, and it is possible to prevent the metal sheet from breaking.

Note that the reason why the resin 9 is bonded to at least the inner surface of the shoulder part of a punch 5*b* of the outer parts 5 is as follows. A portion having a high capability of absorbing crash energy in the tubular member 3 is the shoulder part of a punch 5*b* connecting the top portion 5*a* and the side wall portion 5*c*. On the other hand, the shoulder part of a punch 5*b* is also a portion that is most likely to be subjected to work hardening when the outer parts 5 are press formed, and the ductility is further reduced by the work hardening. Therefore, when the tubular member 3 undergoes buckling deformation, the metal sheet is particularly likely to break in the bellows-shaped convex bent portion of the shoulder part of a punch 5*b*. Therefore, it is essential that the resin 9 bonds to at least the inner surface of the shoulder part of a punch 5*b*.

Figure 3:
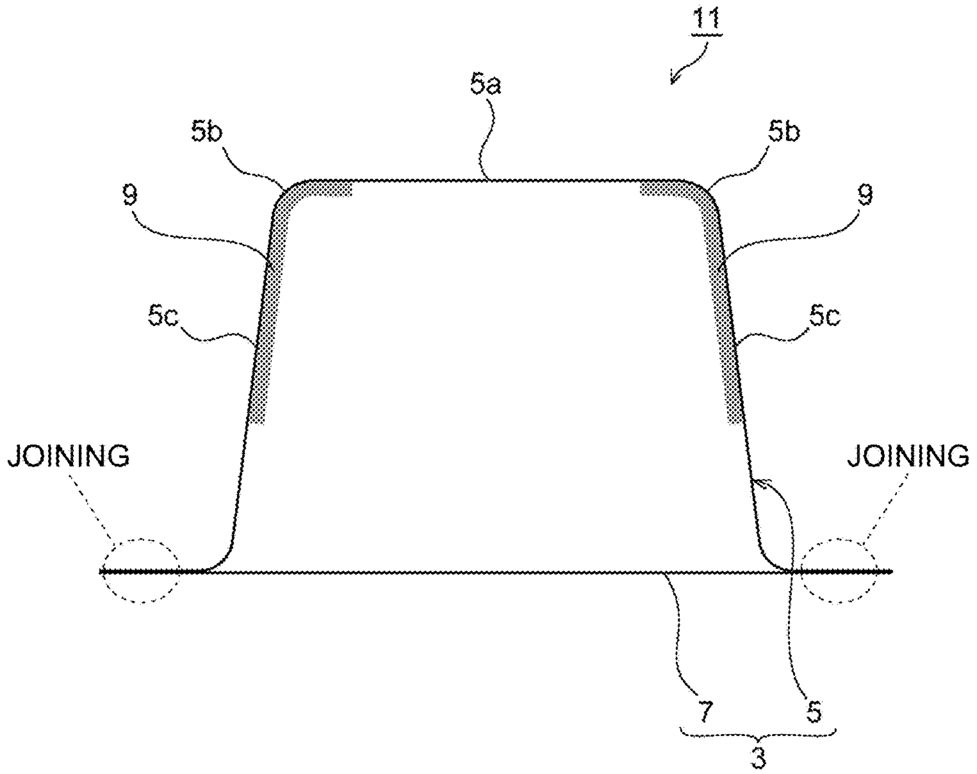
FIG. 3 is a cross-sectional view illustrating another aspect of the crash energy absorption part for an automobile according to the first embodiment of the present invention (part 1).
Figure 4:
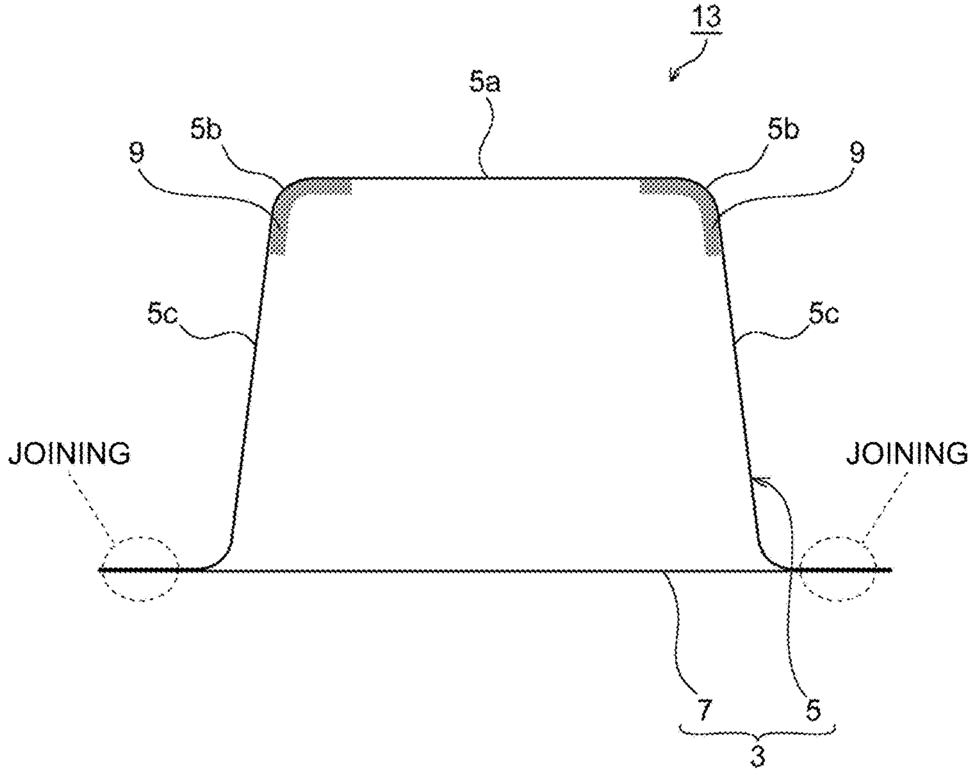
FIG. 4 is a cross-sectional view illustrating another aspect of the crash energy absorption part for an automobile according to the first embodiment of the present invention (part 2).

For example, as another aspect of the present embodiment, even when the resin 9 is applied or patched to the inner surfaces of the shoulder part of a punch 5*b* and the side wall portion 5*c* of the outer parts 5 as in a crash energy absorption part 11 for an automobile illustrated in FIG. 3, or the resin 9 is applied or patched only to the inner surface of the shoulder part of a punch 5*b* as in a crash energy absorption part 13 for an automobile illustrated in FIG. 4, it is possible to suppress deterioration in absorptive properties of crash energy when a crash load is input in the axial direction and to improve buckling strength.

Note that, in the above description, the tubular member 3 is formed by joining the outer parts 5 having a hat-shaped cross section and the inner parts 7 having a flat plate shape by spot welding or the like. However, the tubular member 3 is not limited thereto, and for example, may be formed in a tube-like shape by joining members having a hat-shaped cross section or a U-shaped cross section, may be formed in a polygonal shape in a cross section of a tubular member or a tubular member, or may be formed in a polygonal shape by matching flange surfaces of a plurality of members.

<Method of Manufacturing Crash Energy Absorption Part for Automobile>

Next, a method of manufacturing the crash energy absorption part for an automobile according to the first embodiment will be described. A method of manufacturing a crash energy absorption part for an automobile according to the first embodiment is a method of manufacturing the crash energy absorption part 1 for an automobile illustrated in FIGS. 1 and 2, and includes a step of applying a resin 9 to an inner surface of a tubular member 3 and a step of performing heat treatment on the tubular member 3 to which the resin 9 is applied and improving adhesive strength.

In the step of applying the resin 9 to the inner surface of the tubular member 3, the resin 9 is applied to at least the inner surface of the shoulder part of a punch 5*b* of the outer parts 5 in the tubular member 3 such that the thickness gradually changes in the axial direction from one end side toward the other end side, and the thickest portion has a thickness of 8 mm or less. That is, the resin 9 is applied such that the thickness of the resin 9 gradually decreases from the side to which the crash load is input, or the resin 9 is applied such that the thickness of the resin 9 gradually increases from the side to which the crash load is input.

At this time, the resin 9 may be applied after the outer parts 5 and the inner parts 7 are joined to form the tubular member 3, or the outer parts 5 and the inner parts 7 may be joined to form the tubular member 3 after the resin is applied to the outer part 5.

As a specific method of applying the resin 9, there are a method of spraying the resin 9 using a spray nozzle and applying the resin 9 to the inner surface of the tubular member 3, and a method of applying the resin 9 to the inner surface of the tubular member 3 using a brush or the like. As described above, since the resin 9 may be applied to at least the inner surface of the shoulder part of a punch 5*b* of the outer parts 5, the resin 9 may be applied only to the inner surface of the shoulder part of a punch 5*b* in consideration of an increase in weight due to the resin.

In the step of performing the heat treatment, the tubular member 3 coated with the resin 9 is subjected to the heat treatment under a predetermined condition, and the resin 9 is bonded to the inner surface of the tubular member 3 with an adhesive strength of 10 MPa or more. At this time, the resin 9 and the tubular member 3 can be bonded by adhesive capacity of the resin 9 itself or adhesive.

In the case of bonding due to the adhesive capacity of the resin 9 itself, heat treatment may be performed after the resin 9 is applied to the inner surface of the tubular member 3, and the temperature and time of the heat treatment may be appropriately adjusted such that the adhesive strength is 10 MPa or more according to the type of the applied resin 9. On the other hand, in the case of bonding using an adhesive, the resin 9 and the inner surface of the tubular member 3 are bonded via the adhesive, and then heat treatment is performed, and the temperature and time of the heat treatment may be appropriately adjusted such that the adhesive strength of the adhesive is 10 MPa or more. Furthermore, the step of performing the heat treatment in the present invention may also serve as, for example, a step of performing a baking finish by applying a coating material to the outer surface of the tubular member 3.

Note that, as described above, the adhesive strength between the resin 9 and the inner surface of the tubular member 3 can be determined by a crash experiment of a double-layered square column in which a metal sheet (steel sheet or the like) and the resin are bonded to each other or a measurement using a tensile testing machine.

As described above, the method of manufacturing the crash energy absorption part for an automobile according to the first embodiment applies the resin 9 to the inner surface of the tubular member 3. However, in the present invention, a plate-shaped resin having a thickest portion of 8 mm or less and a thickness gradually changing in the axial direction from one end side to the other end side may be patched to the inner surface of the tubular member 3 using an adhesive. In the step of the heat treatment, the adhesive strength between the plate-shaped resin and the inner surface of the tubular member 3 may be set to 10 MPa or more.

Furthermore, when thermal contraction or the like occurs in the resin 9 by the heat treatment after the resin 9 is applied or patched to the tubular member 3, the thickest portion of the resin 9 after the heat treatment may be 8 mm or less. In such a case, the thickest portion of the resin 9 before the heat treatment may be more than 8 mm.

Second Embodiment

<Crash Energy Absorption Part for Automobile>

Figure 5:
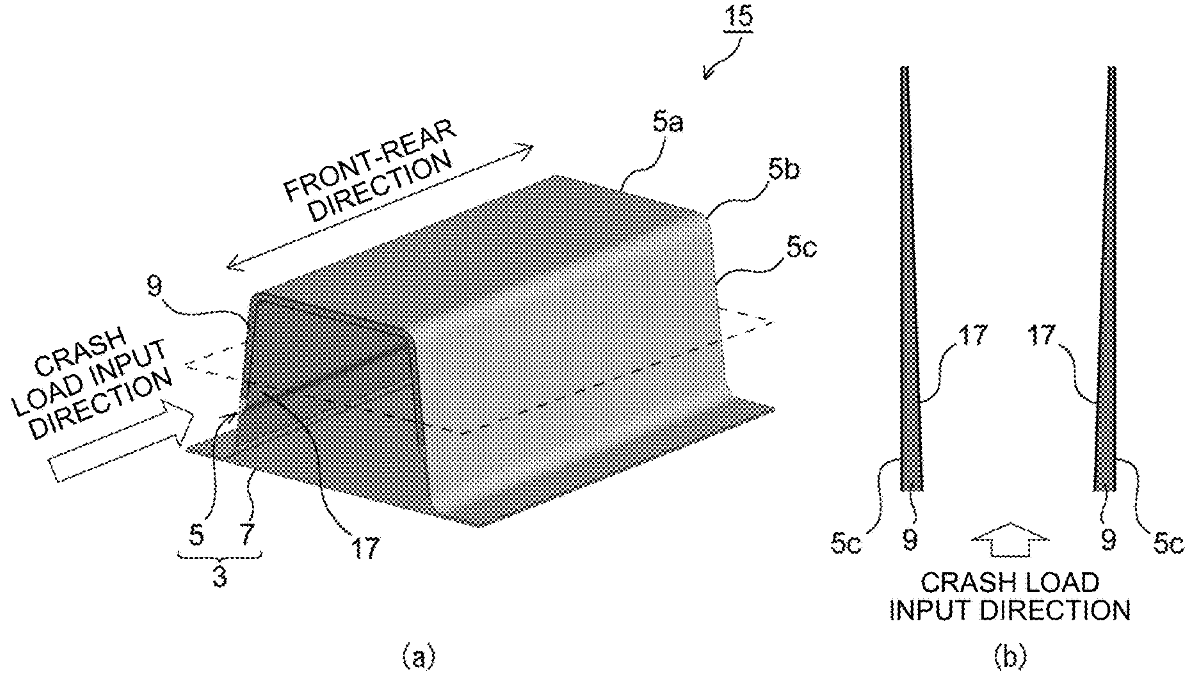
FIG. 5 is a diagram illustrating a crash energy absorption part for an automobile according to a second embodiment of the present invention, in which FIG. 5(*a*) is a perspective view, and FIG. 5(*b*) is an end view in a cross section indicated by a broken line in FIG. 5(*a*).
Figure 6:
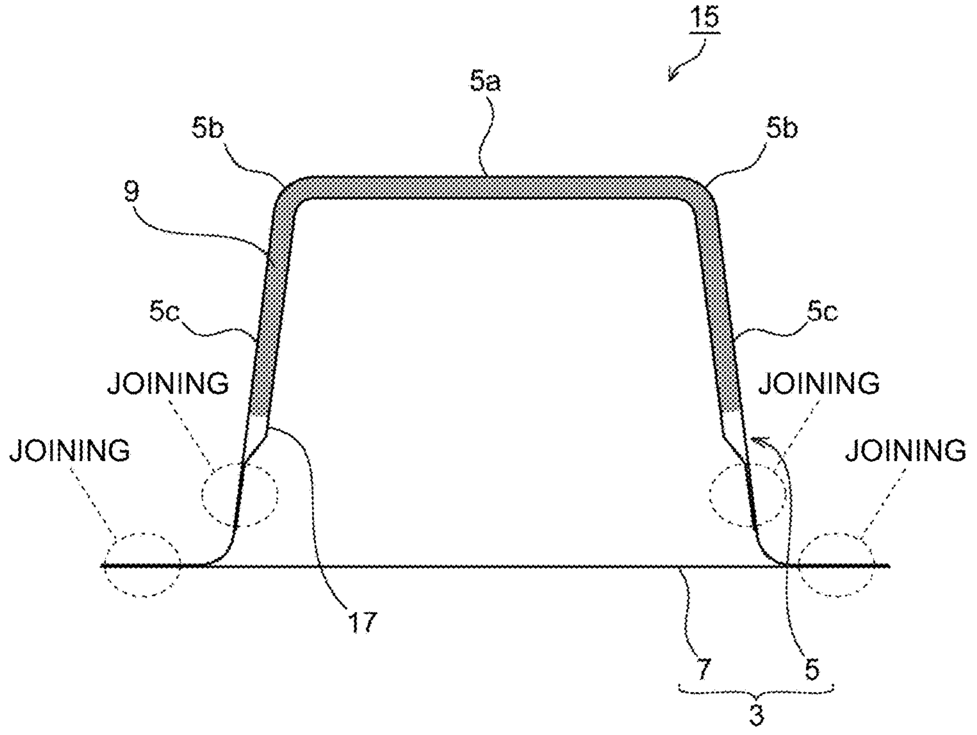
FIG. 6 is a cross-sectional view illustrating the crash energy absorption part for an automobile according to the second embodiment of the present invention.

In the crash energy absorption part 1 for an automobile according to the first embodiment described above, the adhesive strength between the inner surface of the tubular member 3 and the resin 9 is set to 10 MPa or more to prevent the resin 9 from being separated from the inner surface of the tubular member 3 at the time of axial crush. However, in the present embodiment, a means for more reliably preventing the detachment of the resin 9 has been examined. As illustrated in FIGS. 5 and 6, a crash energy absorption part 15 for an automobile according to the second embodiment includes a separation prevention member 17 for preventing the resin 9 from being separated from the inner surface of the tubular member 3 in addition to the configuration of the crash energy absorption part 1 for an automobile described in first embodiment. Since the tubular member 3 and the resin 9 are similar to those of the first embodiment, the description thereof will be omitted, and the separation prevention member 17 will be described in detail below.

The separation prevention member 17 is made of a metal sheet (For example, it is made of a steel sheet.), and as illustrated in FIGS. 5 and 6, covers the surface of the resin 9 applied to the outer parts 5, and is joined to the inner surface of the side wall portion 5*c* of the outer parts 5 by, for example, spot welding or the like. Note that, since the resin 9 is required at least on the inner surface of the shoulder part of a punch 5*b* and it is desired to reduce the weight as much as possible, it is desired to shorten the vertical wall height of the resin 9, such that the separation prevention member 17 is joined to the side wall portion 5*c* of the outer parts 5.

As in the first embodiment, also in the resin 9 in the present embodiment, the thickness of the resin gradually decreases from the side to which the crash load is input (see FIG. 5(*b*)). However, also in the present embodiment, as in the first embodiment, the thickness of the resin 9 may gradually increase from the side to which the crash load is input.

As illustrated in FIG. 5(*b*), the separation prevention member 17 is disposed along the surface of the resin 9, and is bonded to the resin 9 with an adhesive strength of 10 MPa or more. As described above, the resin 9 of the crash energy absorption part 15 for an automobile of the present embodiment is bonded to the inner surface of the tubular member 3 with an adhesive strength of 10 MPa or more, and also is bonded to the separation prevention member 17 with an adhesive strength of 10 MPa or more.

The adhesive strength between the resin 9 and the tubular member 3 and between the resin 9 and the separation prevention member 17 may be determined by crash analysis of a double-layered square column in which a metal sheet (steel sheet or the like) and a resin adhere to each other, or may be determined by measurement by a tensile testing machine after cutting out a part of the resin, the tubular member 3, and the separation prevention member 17 after adhesion, as in the above-described first embodiment.

As described above, in the crash energy absorption part 15 for an automobile according to second embodiment, the resin 9 is applied to the inner surface of the tubular member 3, but in the present invention, a plate-shaped resin having a thickest portion of 8 mm or less and a thickness gradually changing in the axial direction from one end side to the other end side may be patched to the inner surface of the tubular member 3 using an adhesive. The adhesive strength between the plate-shaped resin and the inner surface of the tubular member 3 and the separation prevention member 17 may be 10 MPa or more.

Note that although the crash energy absorption part 15 for an automobile of FIGS. 5 and 6 described above is provided with the separation prevention member 17 in the crash energy absorption part 1 for an automobile of FIGS. 1 and 2 described in the first embodiment, the present embodiment can also be applied to modes such as the crash energy absorption parts for an automobile 11 and 13 of FIGS. 3 and 4. As illustrated in FIGS. 3 and 4, in a case where the resin 9 is applied or patched separately at two locations, one separation prevention member 17 may be used as in FIGS. 5 and 6, or two separation prevention members 17 may be used and disposed along the surface of the resin 9. In this case, the two separation prevention members 17 are joined to the top portion 5*a* and the side wall portion 5*c* of the tubular member 3.

<Method of Manufacturing Crash Energy Absorption Part for Automobile>

Next, a method of manufacturing a crash energy absorption part for an automobile according to the second embodiment will be described. A method of manufacturing the crash energy absorption part for an automobile according to the second embodiment is a method of manufacturing the crash energy absorption part 15 for an automobile illustrated in FIGS. 5 and 6, and includes a step of applying the resin 9 to the inner surface of the tubular member 3, a step of joining the separation prevention member 17 to the inner surface of the side wall portion 5*c* of the tubular member 3, and a step of heat-treating the tubular member 3 to which the resin 9 is applied under a predetermined condition and bonding the resin 9 to each of the inner surface of the tubular member 3 and the separation prevention member 17 at an adhesive strength of 10 MPa or more.

In the step of applying the resin 9 to the inner surface of the tubular member 3, the resin 9 is applied to at least the inner surface of the shoulder part of a punch 5*b* of the outer parts 5 in the tubular member 3 such that the thickness gradually changes in the axial direction from one end side toward the other end side, and the thickest portion becomes 8 mm or less. That is, the resin 9 is applied such that the thickness of the resin 9 gradually decreases from the side to which the crash load is input, or the resin 9 is applied such that the thickness of the resin 9 gradually increases from the side to which the crash load is input.

Furthermore, in addition to applying the liquid resin 9 to the inner surface of the tubular member 3 as described above, a plate-like resin 9 having a thickest portion of 8 mm or less and a thickness gradually changing in the axial direction from one end side to the other end side may be patched to the inner surface of the tubular member 3 using an adhesive.

In the step of joining the separation prevention member 17, which prevents the resin 9 applied or patched to the inner surface of the tubular member 3 from being separated from the inner surface of the tubular member 3, to the inner surface of the tubular member 3, the separation prevention member 17 is disposed so as to cover the surface of the resin 9, patched to the resin 9 or bonded to the resin 9 using an adhesive, and joined to the inner surface of the side wall portion 5*c* of the outer parts 5 by spot welding or the like.

At this time, after the outer parts 5 and the inner parts 7 are joined to form the tubular member 3, the separation prevention member 17 may be joined to the inner surface of the tubular member 3 after the resin 9 is applied or patched, or after the resin is applied to the outer parts 5, the separation prevention member 17 may be joined to the inner surface of the side wall portion 5*c* of the outer parts 5, and then the outer parts 5 and the inner parts 7 may be joined to form the tubular member 3.

Then, in the step of performing the heat treatment, the tubular member 3 on which the resin 9 is applied or patched and the separation prevention member 17 is disposed is subjected to the heat treatment under a predetermined condition, and the resin 9 is bonded to each of the inner surface of the tubular member 3 and the separation prevention member 17 with an adhesive strength of 10 MPa or more. At this time, the resin 9 and the tubular member 3, and the resin 9 and the separation prevention member 17 can be bonded to each other by the adhesive capacity of the resin 9 itself or the adhesive as described in the first embodiment.

In the case of bonding due to the adhesive capacity of the resin 9 itself, the temperature and time of the heat treatment may be appropriately adjusted such that the adhesive strength is 10 MPa or more according to the type of the applied resin 9. On the other hand, in the case of bonding using an adhesive, the temperature and time of the heat treatment may be appropriately adjusted such that the adhesive strength of the adhesive is 10 MPa or more. Furthermore, the step of performing the heat treatment in the present invention may also serve as, for example, a step of performing a baking finish by applying a coating material to the outer surface of the tubular member 3.

As described above, the adhesive strength between the resin 9 and the inner surface of the tubular member 3 and the separation prevention member 17 can be determined by crash analysis of a double-layered square column obtained by bonding a metal sheet (steel sheet or the like) and the resin 9 or measurement using a tensile testing machine.

In the above description, the method of manufacturing the crash energy absorption part 15 for an automobile according to the second embodiment is a method in which the separation prevention member 17 is joined to the inner surface of the tubular member 3 after the resin 9 is applied to the inner surface of the tubular member 3, but the application of the resin 9 and the arrangement of the separation prevention member 17 are not limited to the above order, and an aspect as described below may be adopted. For example, the method may include a step of applying or patching the resin 9 to at least a portion of the separation prevention member 17, which will face the inner surface of the shoulder part of a punch 5*b* when joined to the tubular member 3, such that the thickness gradually changes in the axial direction from one end side toward the other end side and the thickest portion has a thickness of 8 mm or less, a step of disposing the separation prevention member 17 such that the resin 9 applied or patched to the separation prevention member 17 abuts on the inner surface of the tubular member 3 and joining the separation prevention member 17 to the inner surface of the side wall portion 5*c* of the tubular member 3, and a step of performing heat treatment to the tubular member 3 joining the separation prevention member 17 to the inner surface under a predetermined condition and bonding the resin 9 to each of the inner surface of the tubular member 3 and the separation prevention member 17 at an adhesive strength of 10 MPa or more.

Also in the above manufacturing method, when the resin 9 is applied or patched to the separation prevention member 17, the resin 9 is applied or patched such that the thickness of the resin 9 gradually decreases from the side to which the crash load is input, or the resin 9 is applied or patched such that the thickness of the resin 9 gradually increases from the side to which the crash load is input.

Furthermore, the method may include a step of joining the separation prevention member 17 to the inner surface of the tubular member 3 so as to form a gap between at least the inner surface of the shoulder part of a punch 5*b* of the tubular member 3, the gap gradually changing in the axial direction from one end side toward the other end side, and having the largest portion of 8 mm or less, a step of applying or patching the resin 9 to the gap, and a step of performing heat treatment to the tubular member 3 with the resin 9 applied or patched to the gap under a predetermined condition, and bonding the resin 9 to each of the inner surface of the tubular member 3 and the separation prevention member 17 with an adhesive strength of 10 MPa or more.

In the above manufacturing method, when it is desired to apply or patch the resin 9 whose thickness gradually decreases from the side to which the crash load is input, the size of the gap between the tubular member 3 and the separation prevention member 17 is gradually reduced from the side to which the crash load is input. Furthermore, in a case where it is desired to apply or patch the resin 9 whose thickness gradually increases from the side to which the crash load is input, the size of the gap between the tubular member 3 and the separation prevention member 17 is gradually increased from the side to which the crash load is input.

Examples of the method of applying the resin 9 to the gap between the inner surface of the tubular member 3 and the separation prevention member 17 include a method in which the resin 9 is sprayed using a spray nozzle to fill the gap with the resin 9, and a method in which the tubular member 3 is immersed in a reservoir in which a coating material containing the resin 9 is stored and the resin 9 is poured into the gap. Furthermore, as a method of patching the resin 9 to the gap between the inner surface of the tubular member 3 and the separation prevention member 17, there is a method of inserting, into the gap, a resin plate processed in advance so as to correspond to the gap, to which an adhesive has been applied. Note that the adhesive may be sprayed and applied to the gap using a spray nozzle.

In the crash energy absorption part 15 for an automobile according to second embodiment, as in first embodiment, since the thickness of the resin 9 gradually changes in the axial direction from one end side toward the other end side of the tubular member 3, for example, when a crash load is input from a direction indicated by a white arrow in FIG. 5, buckling deformation is started from an end portion on a side where the thickness of the resin 9 is thin. Thereafter, buckling deformation is sequentially generated toward an end portion on the side where the thickness of the resin 9 is thick in the axial direction, and a stable crash energy absorption effect can be obtained. This point will be demonstrated in Examples described later.

Furthermore, since the separation prevention member 17 is provided to reliably prevent the resin 9 from being separated from the inner surface of the tubular member 3 in the process in which the tubular member 3 is buckled and deformed in a bellows shape and axially crushed, the resin 9 is compressed and deformed together with the tubular member 3 without being separated from the inner surface of the tubular member 3 in the process of axial crush. As a result, when the tubular member 3 is buckled and deformed, the resin 9 is sandwiched between the metal sheet and the metal sheet in the bent portion deformed in the convex shape to prevent breakage of the tubular member 3, and crash energy absorptive properties can be improved.

EXAMPLES

An experiment for confirming the effect of the crash energy absorption part for an automobile according to the present invention has been conducted, and the results thereof will be described below.

In the present Example, the crash energy absorption part for an automobile according to the present invention was used as a specimen, and a deformation form by an axial crushing test and absorption characteristics of crash energy were evaluated.

As Invention Examples 1 and 2, the above-described crash energy absorption part for an automobile according to second embodiment of the present invention was used as specimens 19 and 21. Furthermore, as Invention Examples 3 and 4, the crash energy absorption part for an automobile according to first embodiment of the present invention described above was used as specimens 23 and 25. The specimens 19 and 21 have the tubular member 3 in which the outer parts 5 and the inner parts 7 are joined by spot welding, and the separation prevention member 17 is disposed so as to cover the resin 9 applied or patched to the inner surfaces of the top portion 5*a*, the shoulder part of a punch 5*b*, and the side wall portion 5*c* of the outer parts 5 and joined to the inner surface of the side wall portion 5*c* of the outer parts 5.

In the specimen 19 of Invention Example 1, as a structure in which the tip on the collision side serves as a buckling start point and is sequentially deformed from the tip, the thickness of the resin gradually increases from the side to which the crash load is input, the resin thickness on the collision side was 1 mm, and the resin thickness on the fixed side was 8 mm. The resin weight of the specimen 19 was 0.22 kg. The specimen 23 of Invention Example 3 was the same as the specimen 19 except that the separation prevention member 17 was not disposed.

In the specimen 21 of Invention Example 2, as a structure in which a fixed end opposite to a collision end serves as a buckling start point and is sequentially deformed from a rear end, the thickness of the resin gradually decreases from a side to which a crash load is input, the resin thickness on the collision side was 8 mm, and the resin thickness on the fixed side was 1 mm. The resin weight of the specimen 21 was 0.22 kg. The specimen 25 of Invention Example 4 was the same as the specimen 21 except that the separation prevention member 17 was not disposed.

Furthermore, as Comparative Example 1, a specimen including the tubular member 3, the resin 9, and the separation prevention member 17, in which the thickness of the resin 9 was constant from the front end to the rear end was used as the specimen 27. The resin thickness of the specimen 27 was 4.5 mm, and the resin weight was 0.22 kg. Moreover, as Comparative Example 2, a specimen identical to the specimen 27 except that the separation prevention member 17 was not disposed was used as the specimen 29.

Figure 7:
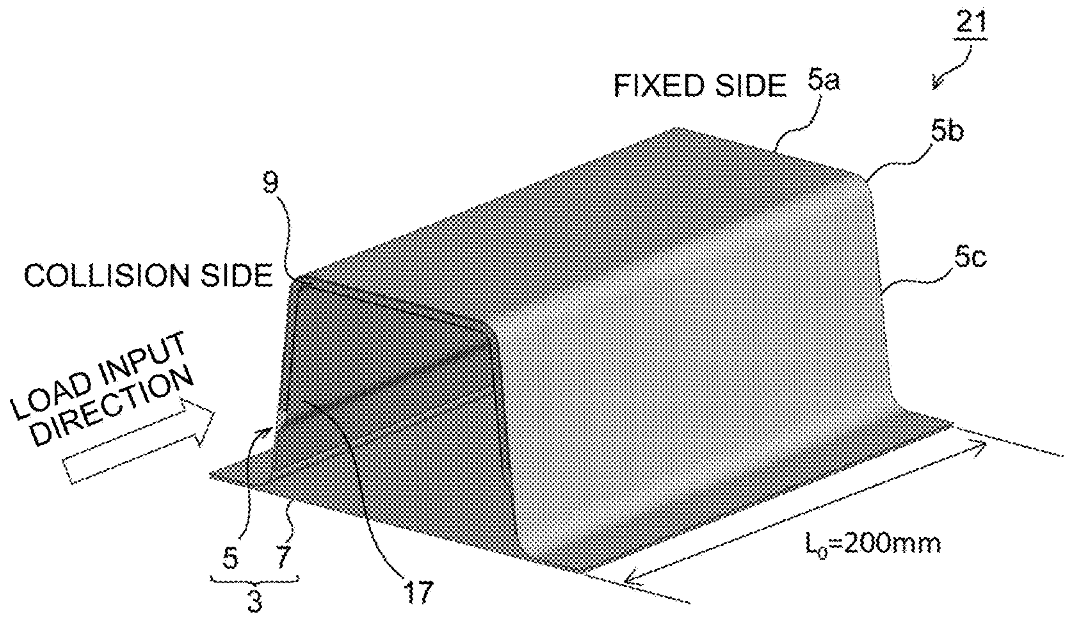
FIG. 7 is a diagram illustrating a structure of a specimen used as Invention Example 1 in Examples.

A test method of the axial crushing test in this example will be described with reference to FIG. 7 by taking the specimen 21 as an example. As illustrated in FIG. 7, one end side of the specimen 21 was fixed, and a load was input by causing a colliding body (not illustrated) to collide in the axial direction from the other end side at a test speed of 17.8 m/sec. A load-stroke curve illustrating a relationship between a load and a stroke (amount of axial crushing deformation) when a specimen length (axial length L0 of the specimen) was axially crushed and deformed by 120 mm from 200 mm to 80 mm was measured, and absorbed energy up to a stroke of 0 to 120 mm was obtained. Furthermore, the specimens 19 and 23 to 29 were also tested in the same manner. Hereinafter, a side to which a crash load is input is referred to as a "collision side", and a side to be fixed is referred to as a "fixed side".

Figure 8:
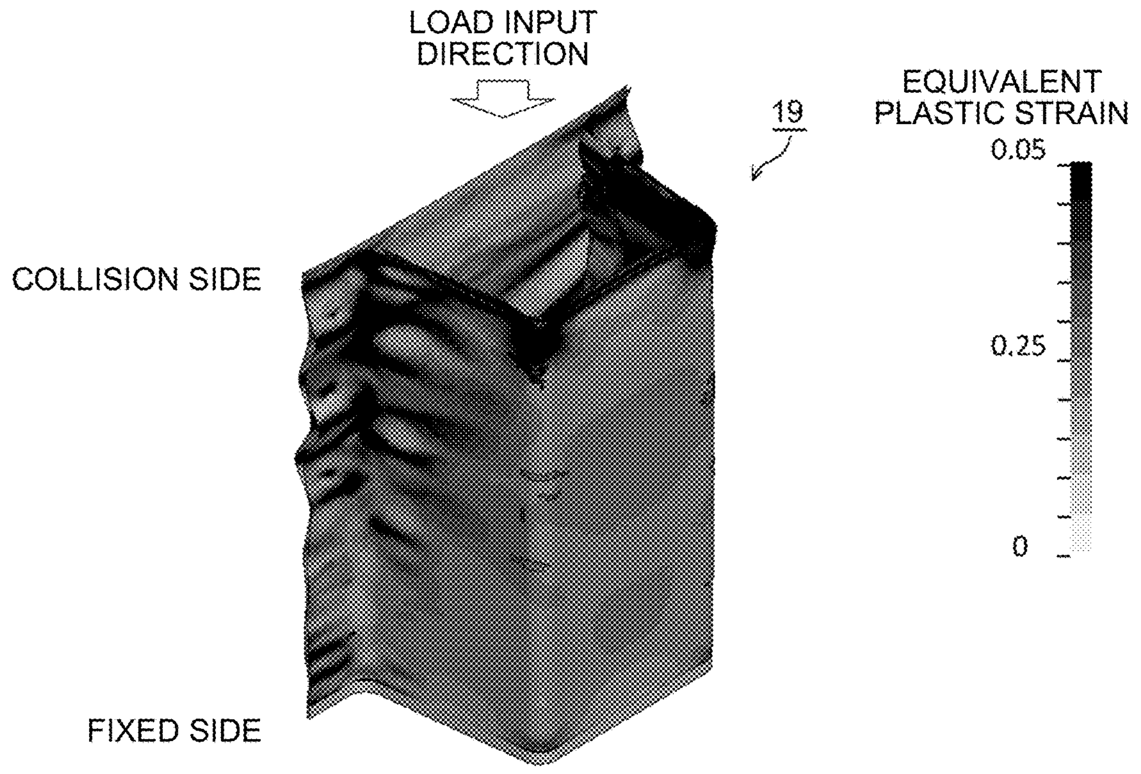
FIG. 8 is a diagram illustrating a strain distribution of a tubular member when a stroke is 10 mm in axial crush analysis of a specimen according to Invention Example 1 in Examples.

FIG. 8 illustrates the strain distribution of the specimen 19 (Invention Example 1) when the stroke is 10 mm. As illustrated in FIG. 8, it can be seen that the strain is concentrated in a range of about 20 mm from the tip on the collision side of the specimen 19, and the tip on the collision side is the buckling start point.

Figure 9:
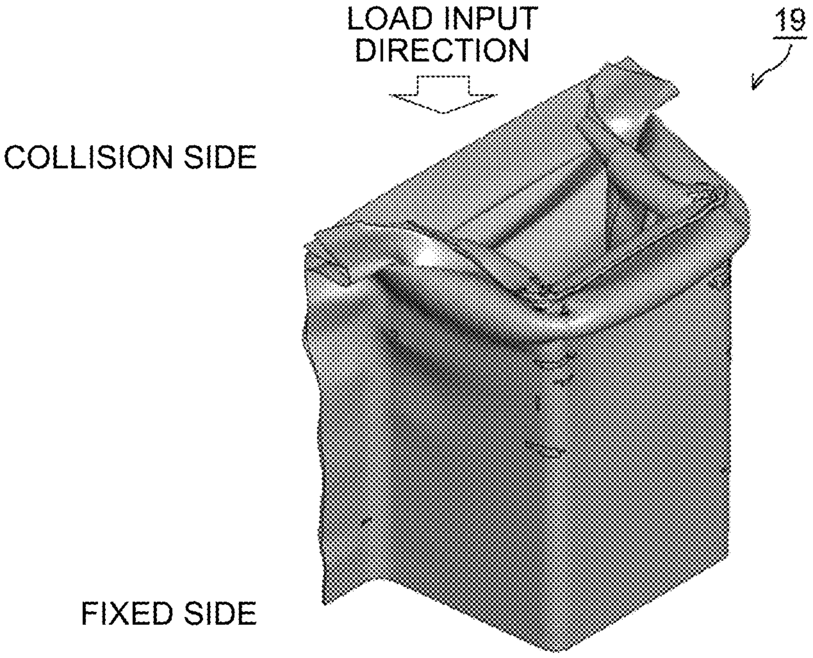
FIG. 9 is a diagram illustrating an appearance of a tubular member when a stroke is 50 mm in axial crush analysis of a specimen according to Invention Example 1 in Examples.

FIG. 9 illustrates the appearance of the specimen 19 when the stroke is 50 mm. As illustrated in FIG. 9, at the initial stage of the crash, the tip of the collision side is sequentially deformed into a bellows shape from the tip of the collision side. In the specimen 19, the tip on the collision side having the smallest resin thickness was the buckling start point, and the buckling deformation was sequentially performed from the tip on the collision side to the fixed side.

Figure 10:
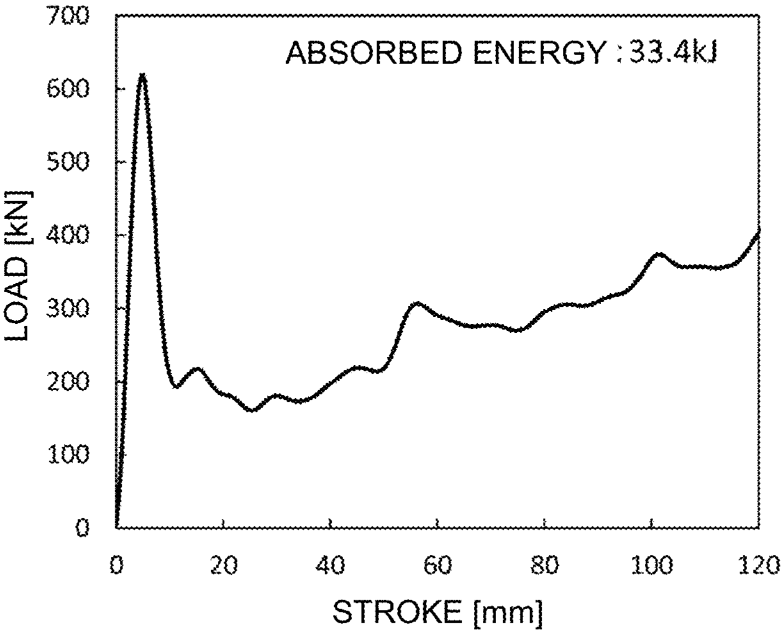
FIG. 10 is a diagram illustrating a load-stroke curve according to Invention Example 1 in Examples.

FIG. 10 illustrates a load-stroke curve of the specimen 19. As illustrated in FIG. 10, the maximum load of the specimen 19 immediately after the start of load input was 620 kN, and the absorbed energy at a stroke of 0 to 120 mm was 33.4 kJ.

Figure 11:
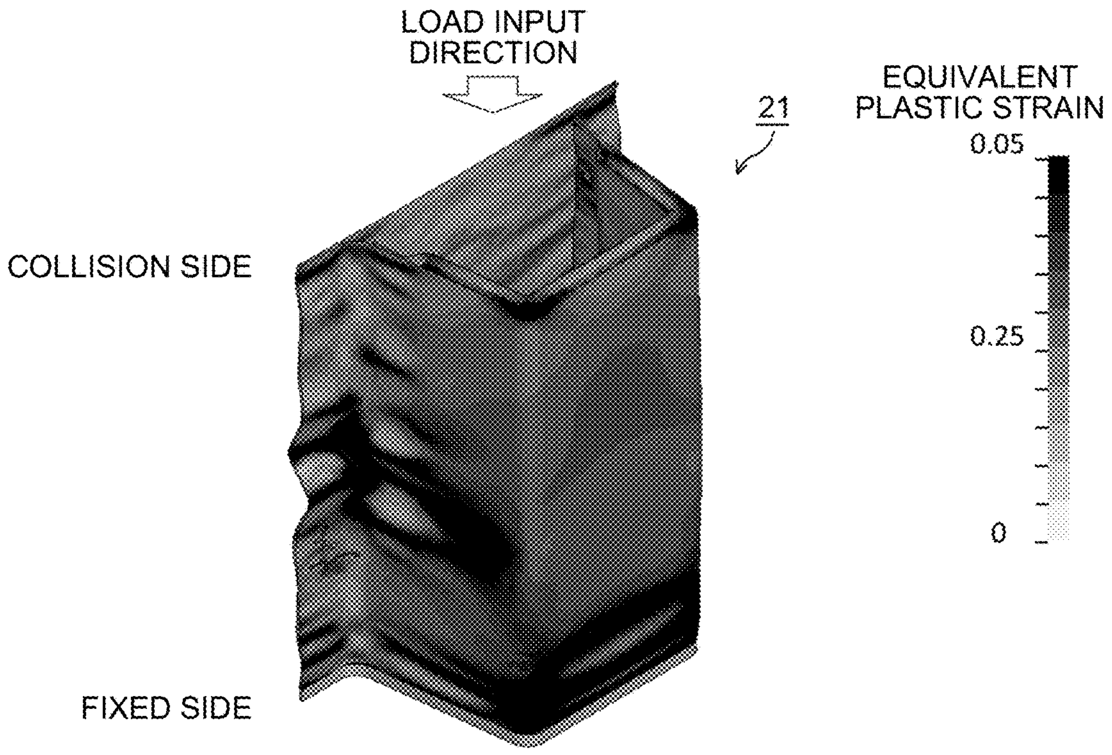
FIG. 11 is a diagram illustrating a strain distribution of a tubular member when a stroke is 10 mm in axial crush analysis of a specimen according to Invention Example 2 in Examples.

FIG. 11 illustrates the strain distribution of the specimen 21 (Invention Example 2) when the stroke is 10 mm. As illustrated in FIG. 11, it can be seen that strain is concentrated on the fixed side of the specimen 21, and the fixed side is the buckling start point.

Figure 12:
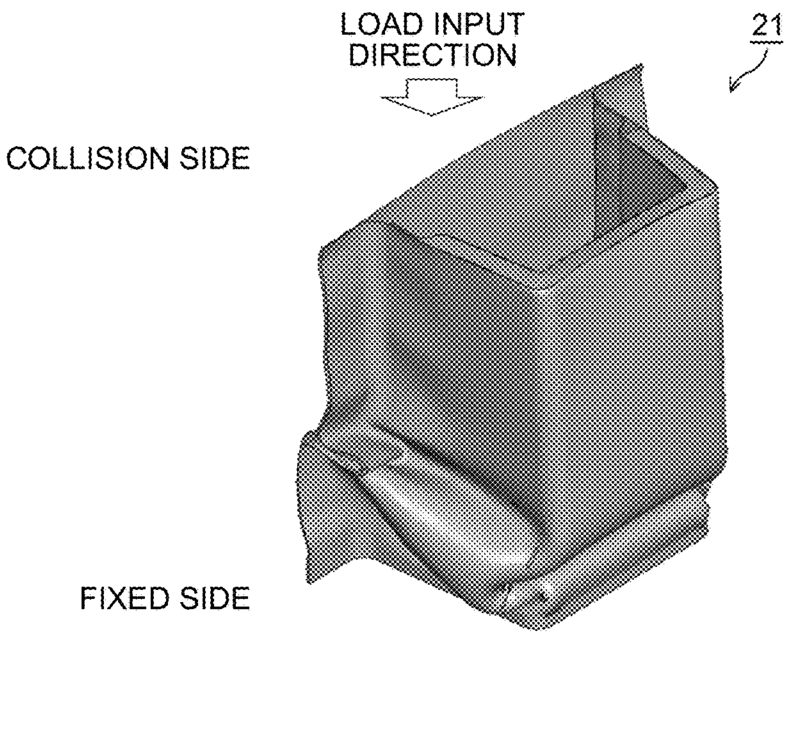
FIG. 12 is a diagram illustrating an appearance of a tubular member when a stroke is 50 mm in axial crush analysis of a specimen according to Invention Example 2 in Examples.

FIG. 12 illustrates the appearance of the specimen 21 when the stroke is 50 mm. As illustrated in FIG. 12, at the initial stage of the crash, deformation is sequentially performed in a bellows shape from the fixed side. In the specimen 21, a portion having the thinnest resin thickness except for the fixed portion on the fixed side was a buckling start point, and buckling deformation was sequentially performed from the fixed side to the collision side.

Figure 13:
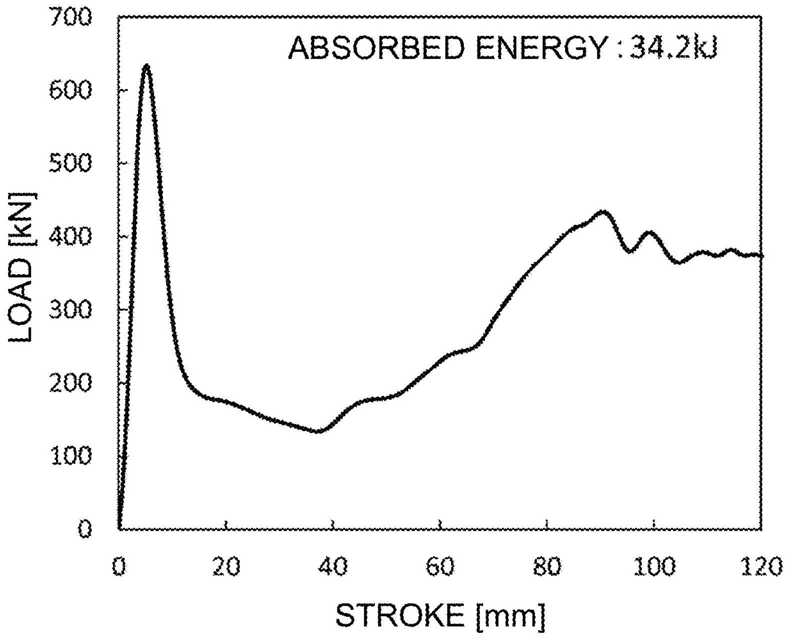
FIG. 13 is a diagram illustrating a load-stroke curve according to Invention Example 2 in Examples.

FIG. 13 illustrates a load-stroke curve of the specimen 21. As illustrated in FIG. 13, the maximum load of the specimen 21 immediately after the start of load input was 633 kN, and the absorbed energy at a stroke of 0 to 120 mm was 34.2 kJ.

Figure 14:
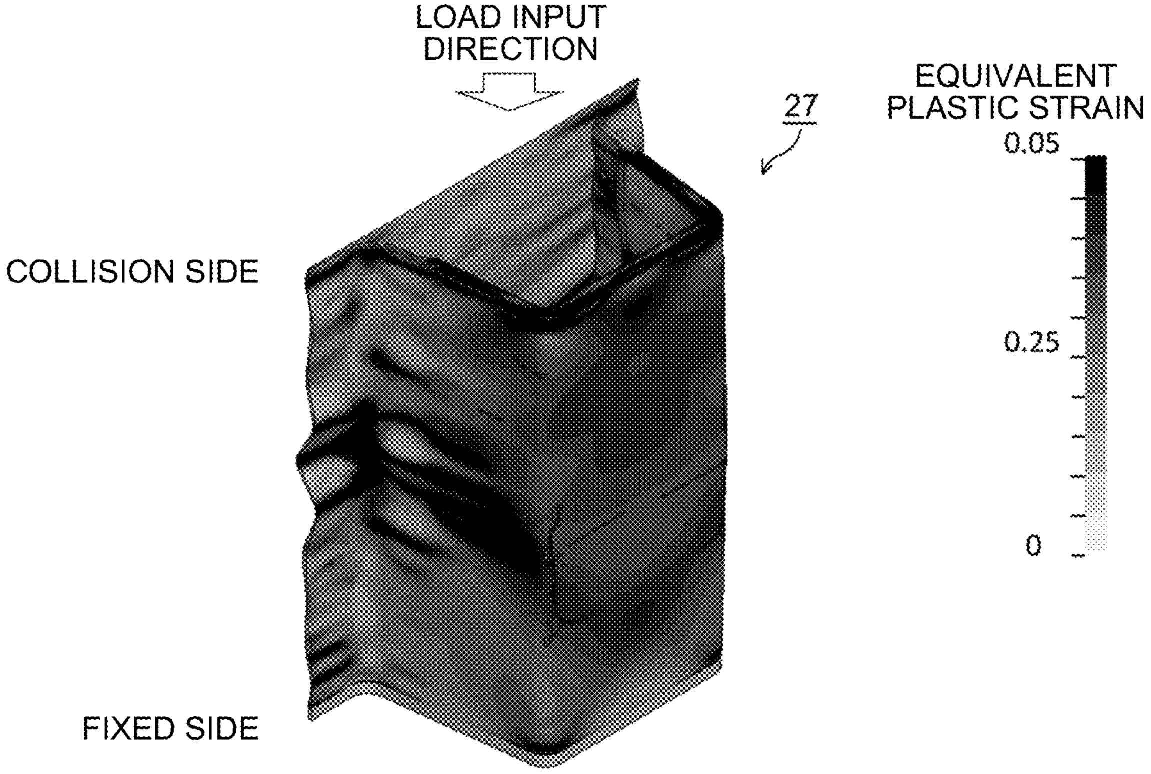
FIG. 14 is a diagram illustrating a strain distribution of a tubular member when a stroke is 10 mm in axial crush analysis of a specimen according to Comparative Example 1 in Examples.

FIG. 14 illustrates the strain distribution of the specimen 27 (Comparative Example 1) when the stroke is 10 mm. As illustrated in FIG. 14, in the specimen 27, the strain is distributed in a wide range as compared with the specimen 19 (see FIG. 8) and the specimen 21 (see FIG. 11), and it can be seen that the robustness (robust property) of the buckling start point is deteriorated.

Figure 15:
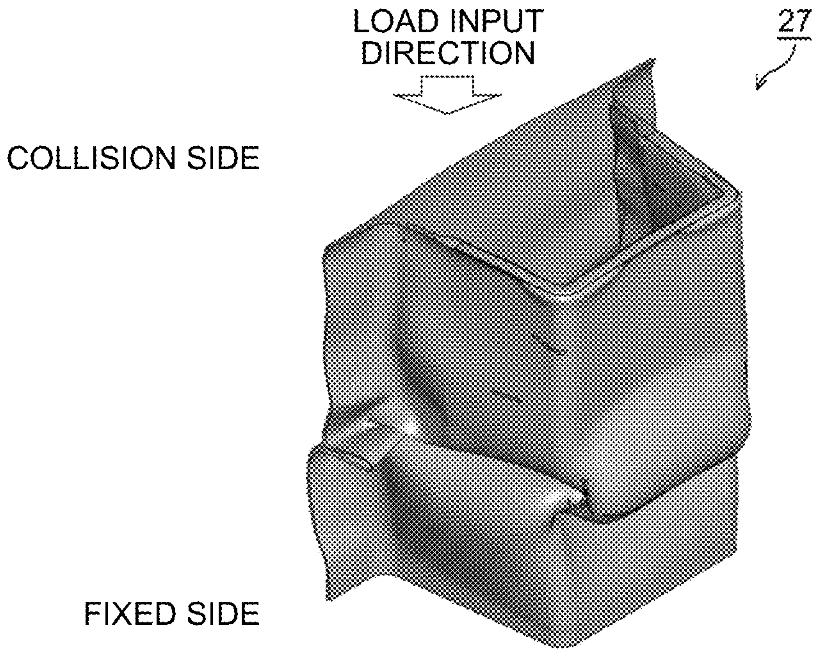
FIG. 15 is a diagram illustrating an appearance of a tubular member when a stroke is 50 mm in axial crush analysis of a specimen according to Comparative Example 1 in Examples.

FIG. 15 illustrates the appearance of the specimen 27 when the stroke is 50 mm. As illustrated in FIG. 15, at the initial stage of the crash, buckling deformation starts from the center of the specimen 27.

Figure 16:
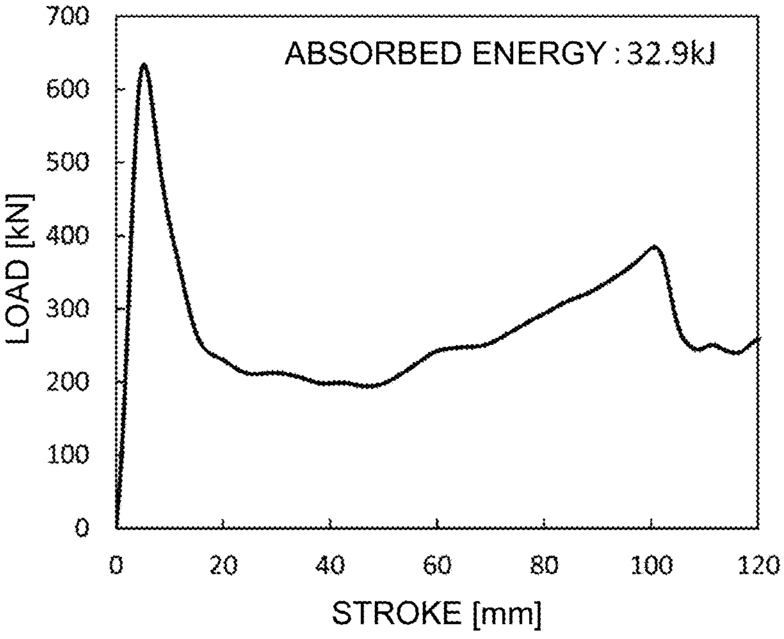
FIG. 16 is a diagram illustrating a load-stroke curve according to Comparative Example 1 in Examples.

FIG. 16 illustrates a load-stroke curve of the specimen 27. As illustrated in FIG. 16, the maximum load of the specimen 27 immediately after the start of load input was 633 kN, and the absorbed energy at a stroke of 0 to 120 mm was 32.9 kJ.

Figure 17:
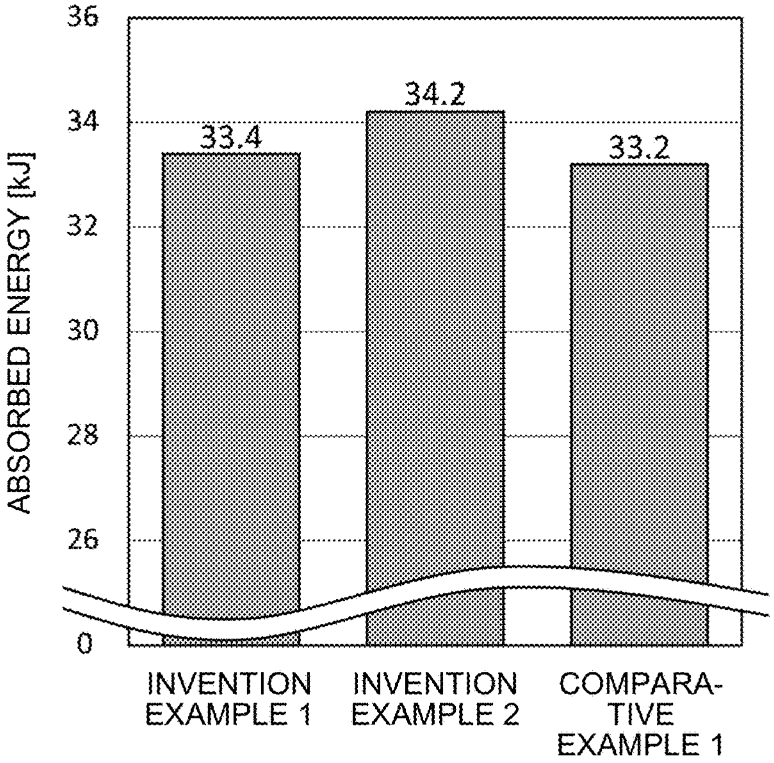
FIG. 17 is a graph illustrating absorbed energy in Invention Examples 1 and 2 and Comparative Example 1 in Examples.
Figure 18:
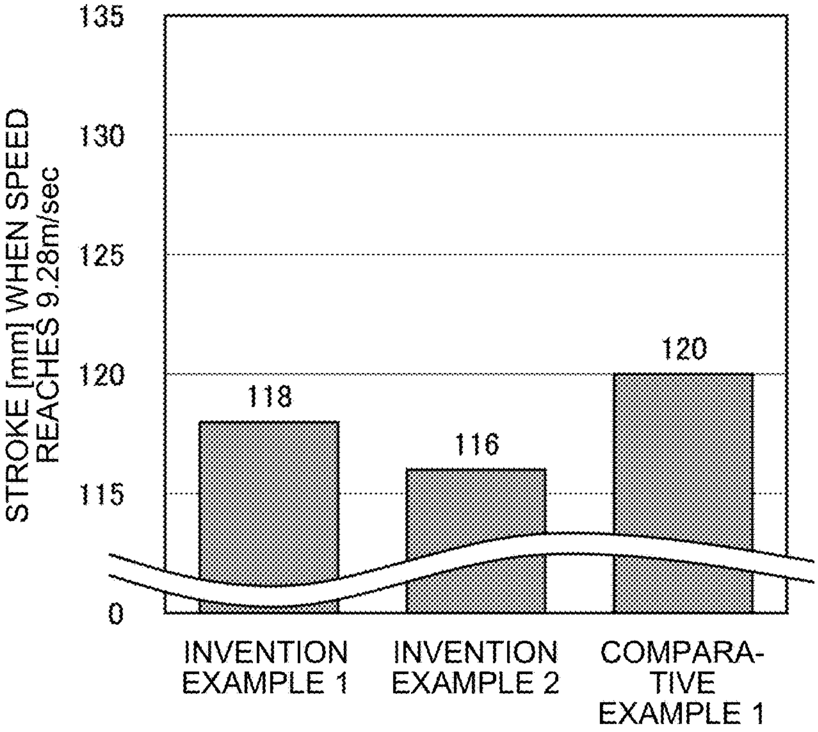
FIG. 18 is a graph illustrating stroke amounts at the time of reaching a speed of 9.28 m/sec in Invention Examples 1 and 2 and Comparative Example 1 in Examples.

FIGS. 17 and 18 are graphs comparing the crashworthiness of Invention Examples 1 and 2 and Comparative Example 1 in the present embodiment described above. FIG. 17 is a comparison of absorbed energy at a stroke of 0 to 120 mm in each example. As illustrated in FIG. 17, in both Invention Examples 1 and 2, the absorbed energy was equal to or higher than that of Comparative Example 1 having the same resin weight, and high crashworthiness was exhibited in the Invention Example according to second embodiment of the present invention. Next, in each example, a stroke required for the colliding body colliding at a test speed of 17.8 m/sec to decrease to a certain speed was compared. In Comparative Example 1, since the velocity of the impact object was 9.28 m/sec when the stroke was 120 mm, the stroke amounts in each example when the velocity of the impact object decreased to 9.28 m/sec were compared. The results are illustrated in FIG. 18.

The stroke amount when the velocity of the impact object decreased to 9.28 m/sec was 120 mm in Comparative Example 1, whereas the stroke amounts were 118 mm and 116 mm in Invention Examples 1 and 2, respectively. This indicates that the energy absorbed by the 120 mm axial crushing in Comparative Example 1 was absorbed by the stroke amount shorter than that in Comparative Example 1 in Invention Examples 1 and 2, and also in FIG. 18, the improvement of the crashworthiness in the invention example according to the second embodiment of the present invention was illustrated.

Also in the specimen 23 (not illustrated) of Invention Example 3, similarly to the specimen 19 (Invention Example 1), the tip on the collision side having the thinnest resin thickness served as the buckling start point, and was sequentially buckled and deformed in a bellows shape from the tip on the collision side to the fixed side. Furthermore, the resin 9 was not separated from the inner surface of the tubular member 3 during the axial crushing test. From the load-stroke curve (not illustrated) of the specimen 23, the maximum load of the specimen 23 immediately after the start of load input was 576 kN, and the absorbed energy at a stroke of 0 to 120 mm was 27.4 kJ.

Also in the specimen 25 (not illustrated) of Invention Example 4, similarly to the specimen 21 (Invention Example 2), a portion having the thinnest resin thickness excluding the fixed portion on the fixed side served as a buckling start point, and the specimen was sequentially buckled and deformed in a bellows shape from the fixed side to the collision side. Furthermore, the resin 9 was not separated from the inner surface of the tubular member 3 during the axial crushing test. From the load-stroke curve (not illustrated) of the specimen 25, the maximum load of the specimen 25 immediately after the start of load input was 587 kN, and the absorbed energy at a stroke of 0 to 120 mm was 31.9 kJ.

Also in the specimen 29 (not illustrated) of Comparative Example 2, buckling deformation started from the center of the specimen 27, similarly to the specimen 29 (Comparative Example 1). Furthermore, the resin 9 was not separated from the inner surface of the tubular member 3 during the axial crushing test. From the load-stroke curve (not illustrated) of the specimen 29, the maximum load of the specimen 29 immediately after the start of load input was 613 kN, and the absorbed energy at a stroke of 0 to 120 mm was 27.1 kJ.

Figure 19:
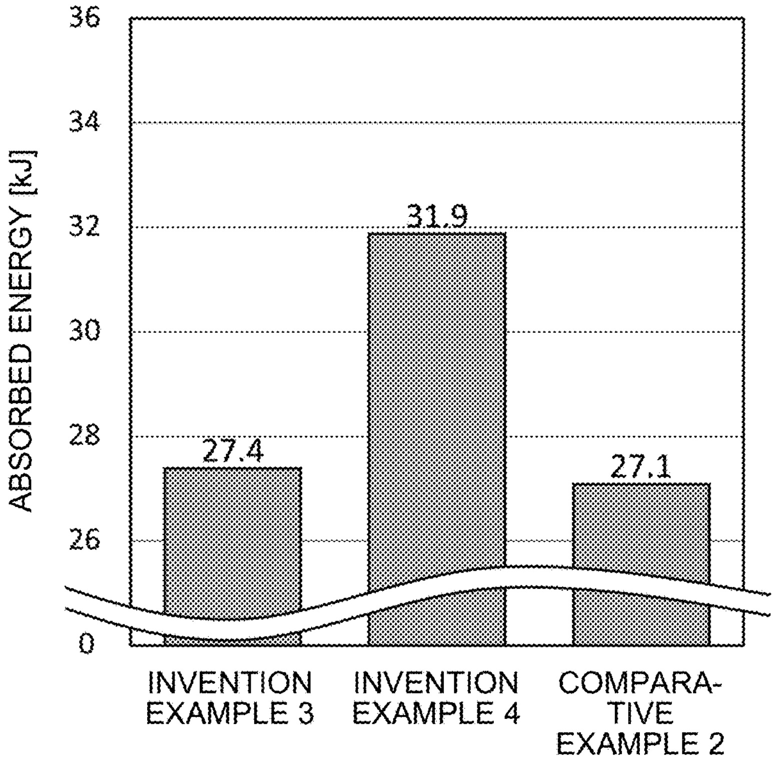
FIG. 19 is a graph illustrating absorbed energy in Invention Examples 3 and 4 and Comparative Example 2 in Examples.
Figure 20:
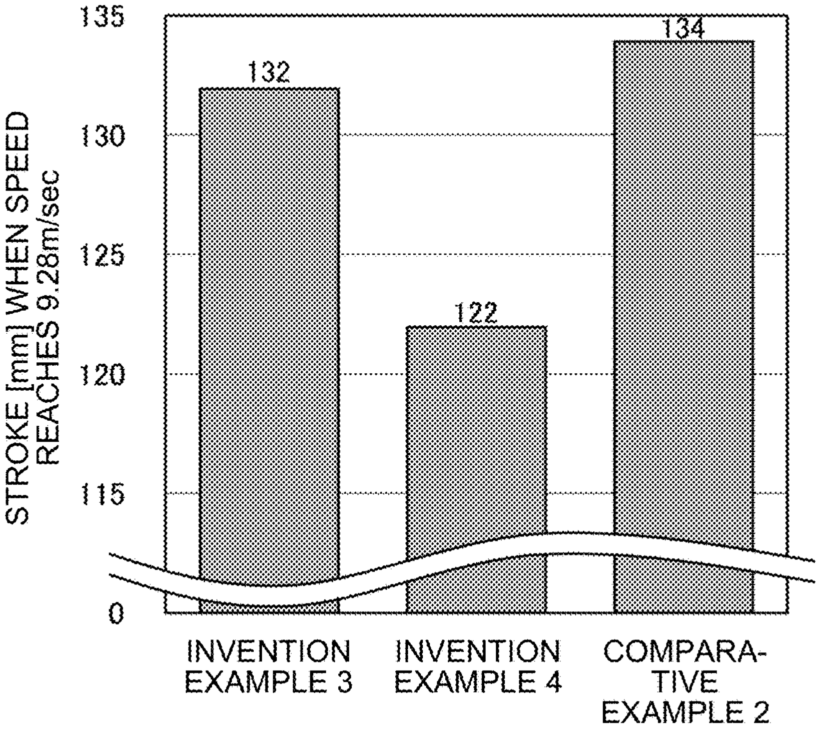
FIG. 20 is a graph illustrating stroke amounts at the time of reaching a speed of 9.28 m/sec in Invention Examples 3 and 4 and Comparative Example 2 in Examples.

FIGS. 19 and 20 illustrates graphs comparing the crashworthiness of Invention Examples 3 and 4 and Comparative Example 2 in the present example described above. FIG. 19 is a comparison of absorbed energy at a stroke of 0 to 120 mm in each example. As illustrated in FIG. 19, in both of Invention Examples 3 and 4, the absorbed energy was equal to or more than that of Comparative Example 2 having the same resin weight, and the high crashworthiness in the invention example according to the first embodiment of the present invention was illustrated.

Next, in each example, the stroke amount when the speed of the colliding body collided at a test speed of 17.8 m/sec was decreased to 9.28 m/sec was compared. The results are illustrated in FIG. 20.

The stroke amount when the velocity of the impact object decreased to 9.28 m/sec was 134 mm in Comparative Example 2, whereas the stroke amounts were 132 mm and 122 mm in Invention Examples 3 and 4, respectively. This indicates that the energy absorbed by the 134 mm axial crushing in Comparative Example 2 was absorbed by the stroke amounts shorter than those in Comparative Example 2 in Invention Examples 3 and 4, and also in FIG. 20, the improvement of the crashworthiness in the invention example according to the first embodiment of the present invention was illustrated.

INDUSTRIAL APPLICABILITY

According to the present invention, it is possible to provide a crash energy absorption part for an automobile, which can be reliably buckled and deformed from one end side toward the other end side and can obtain a stable crash energy absorption effect when a crash load is input from the front or the rear of an automotive body and axial crush is performed, and a method of manufacturing the crash energy absorption part for an automobile.

REFERENCE SIGNS LIST

1 Crash Energy Absorption Part for Automobile (First Embodiment)
3 Tubular Member
5 Outer Parts
**5*a*** Top Portion
**5*b*** Shoulder Part of Punch
**5*c*** Side Wall Portion
7 Inner Parts
9 Resin
11 Crash Energy Absorption Part for Automobile (Another Aspect of First Embodiment)
13 Crash Energy Absorption Part for Automobile (Another Aspect of First Embodiment)
15 Crash Energy Absorption Part for Automobile (Second Embodiment)
17 Separation Prevention Member
19 Specimen (Invention Example 1)
21 Specimen (Invention Example 2)
23 Specimen (Invention Example 3)
25 Specimen (Invention Example 4)
27 Specimen (Comparative Example 1)
29 Specimen (Comparative Example 2)

The invention claimed is:

1. A crash energy absorption part for an automobile, the crash energy absorption part being provided in a front portion or a rear portion of an automotive body and absorbing crash energy when a crash load is input from a front or a rear of the automotive body, the crash energy absorption part comprising:
a top portion;
a tubular member including a side wall portion continuous with the top portion via a shoulder part of a punch; and
a resin applied or patched to at least an inner surface of the shoulder part of a punch of the tubular member,
wherein the resin has a thickness gradually changing in an axial direction starting from one end side toward other end side of the tubular member,
a thickest portion of the thickness is 8 mm or less, and the resin is bonded to the inner surface with an adhesive strength of 10 MPa or more and is axially crushed when the crash load is input.

2. The crash energy absorption part for an automobile according to claim 1, further comprising a separation prevention member configured to cover a surface of the resin, the separation prevention member being joined to an inner surface of the tubular member in order to prevent the resin from being separated from the inner surface,
wherein the resin is also bonded to the separation prevention member with an adhesive strength of 10 MPa or more.

3. A method of manufacturing the crash energy absorption part for an automobile according to claim 2, the method comprising the steps of:
applying or patching the resin to at least the inner surface of the shoulder part of the punch of the tubular member such that the thickness gradually changes from one end side toward the other end side in the axial direction and the thickest portion of the thickness is 8 mm or less;
joining the separation prevention member to the inner surface of the tubular member by disposing the separation prevention member so as to cover the surface of the resin, the separation prevention member being configured to prevent the resin applied or patched to the inner surface from being separated from the inner surface; and
performing heat treatment to the tubular member to which the resin is applied or patched under a predetermined condition to bond the resin to each of the inner surface of the tubular member and the separation prevention member at the adhesive strength of 10 MPa or more.

4. A method of manufacturing the crash energy absorption part for an automobile according to claim 2, the method comprising the steps of:
applying or patching the resin to a portion of the separation prevention member, the portion facing at least the inner surface of the shoulder part of the punch when the separation prevention member is joined to the tubular member, such that the thickness gradually changes in the axial direction from one end side toward the other end side and the thickest portion of the thickness is 8 mm or less;
disposing the separation prevention member such that the resin applied or patched to the separation prevention member abuts on the inner surface of the tubular member to join the separation prevention member to the inner surface of the tubular member; and
performing heat treatment to the tubular member having the separation prevention member joined to the inner surface under a predetermined condition to bond the resin to each of the inner surface of the tubular member and the separation prevention member at the adhesive strength of 10 MPa or more.

5. A method of manufacturing the crash energy absorption part for an automobile according to claim 2, the method comprising the steps of:
joining the separation prevention member to the inner surface of the tubular member so as to form a gap between at least the inner surface of the shoulder part of the punch of the tubular member and the separation prevention member, the gap gradually changing in the axial direction from one end side toward other end side, and having a largest portion of 8 mm or less;
applying or patching the resin to the gap; and
performing heat treatment to the tubular member with the resin applied or patched to the gap under a predetermined condition to bond the resin to each of the inner surface of the tubular member and the separation prevention member at the adhesive strength of 10 MPa or more.

6. The method of manufacturing the crash energy absorption part for an automobile according to claim 5, wherein a size of the gap gradually decreases from an end of the tubular member to which the crash load is input.

7. The method of manufacturing the crash energy absorption part for an automobile according to claim 5, wherein a size of the gap gradually increases from an end of the tubular member to which the crash load is input.

8. The crash energy absorption part for an automobile according to claim 1, wherein a thickness of the resin gradually decreases from the one end side, which is a side to which the crash load is input.

9. The crash energy absorption part for an automobile according to claim 1, wherein a thickness of the resin gradually increases from the one end side, which is a side to which the crash load is input.

10. A method of manufacturing the crash energy absorption part for an automobile according to claim 1, the method comprising the steps of:

applying or patching the resin to at least the inner surface of the shoulder part of the punch of the tubular member such that the thickness gradually changes from one end side to the other end side of the tubular member in the axial direction and the thickest portion of the thickness is 8 mm or less; and performing heat treatment to the tubular member to which the resin is applied or patched under a predetermined condition to bond the resin to the inner surface of the tubular member with the adhesive strength of 10 MPa or more.

11. The method of manufacturing the crash energy absorption part for an automobile according to claim 10, wherein a thickness of the resin gradually decreases from an end of the tubular member to which the crash load is input.

12. The method of manufacturing the crash energy absorption part for an automobile according to claim 10, wherein a thickness of the resin gradually increases from an end of the tubular member to which the crash load is input.

13. The crash energy absorption part for an automobile according to claim 1, wherein the resin has the thickness gradually changing in the axial direction starting from the one end side and ending at the other end side of the tubular member.

* * * * *